United States Patent [19]
Elton et al.

[11] Patent Number: 6,073,515
[45] Date of Patent: Jun. 13, 2000

[54] ADJUSTABLE FOOT SUPPORT

[75] Inventors: Robert Douglas Elton, Ann Arbor; Michael Joseph McKale, Troy, both of Mich.

[73] Assignee: General Motors Corporation, Detroit, Mich.

[21] Appl. No.: 09/120,162

[22] Filed: Jul. 21, 1998

[51] Int. Cl.⁷ .............................. G05G 1/18; G05G 1/14
[52] U.S. Cl. ................. 74/564; 74/512; 74/560; 74/562; 296/75
[58] Field of Search ............... 74/560–564, 512–514, 74/526, 527; 296/75

[56] References Cited

U.S. PATENT DOCUMENTS

| | | | |
|---|---|---|---|
| 1,288,251 | 12/1918 | Staley | 74/564 |
| 1,516,862 | 11/1924 | Loury | 74/564 |
| 1,613,237 | 1/1927 | Meyer | 74/564 |
| 2,167,959 | 8/1939 | Pomernacki | 74/564 |
| 2,618,171 | 11/1952 | Curtis | 74/564 |
| 2,651,944 | 9/1953 | Schetzer | 74/564 |
| 3,059,960 | 4/1962 | Komorowski et al. | |
| 3,487,715 | 1/1970 | Strauss | 74/513 |
| 3,631,739 | 1/1972 | McArthur | |
| 3,643,524 | 2/1972 | Herring | |
| 3,643,525 | 2/1972 | Gibas | |
| 3,828,625 | 8/1974 | Bruhn, Jr. | |
| 3,837,238 | 9/1974 | Walsh | 74/526 |
| 3,975,972 | 8/1976 | Muhleck | |
| 4,546,667 | 10/1985 | Bopst, III | |
| 4,802,381 | 2/1989 | Hsin-hsin | 74/564 X |
| 4,870,871 | 10/1989 | Ivan | |
| 4,875,385 | 10/1989 | Sitrin | |
| 4,955,658 | 9/1990 | Graves | |
| 4,989,474 | 2/1991 | Cicotte et al. | 74/512 |
| 5,010,782 | 4/1991 | Asano et al. | |
| 5,056,742 | 10/1991 | Sakurai | |
| 5,078,024 | 1/1992 | Cicotte et al. | |
| 5,086,663 | 2/1992 | Asano et al. | |
| 5,351,573 | 10/1994 | Cicotte | |
| 5,460,061 | 10/1995 | Redding et al. | |
| 5,497,677 | 3/1996 | Baumann et al. | |
| 5,722,302 | 3/1998 | Rixon et al. | |
| 5,819,593 | 10/1998 | Rixon et al. | 74/514 |

FOREIGN PATENT DOCUMENTS

0410929A1  1/1991  European Pat. Off. .
973638  10/1964  United Kingdom .

*Primary Examiner*—Vinh T. Luong
*Attorney, Agent, or Firm*—Kathryn A. Marra

[57] ABSTRACT

An adjustable foot support for an automotive vehicle, having at least one adjustable actuating foot pedal movable between forward and rear pedal adjustment positions to accommodate varying leg lengths of various operators, includes a normally stationary foot rest for optionally resting a foot of a vehicle operator during periods of inactivity and foot rest adjusting means for selectively adjusting said foot rest between stationary forward and rear foot rest adjustment positions to position the foot rest in a comfortable position that accommodates the varying leg lengths of various operators. The adjusting means may be a powered linkage and is optionally movable in concert with the adjustment linkage of an associated pedal, such as a brake pedal. The foot rest may include dual portions including a foot supporting surface for resting an inactive foot of an operator and a laterally extending heel supporting surface positioned below the brake pedal for limiting relative travel of a heel and ball of a foot operatively engaging the brake pedal.

14 Claims, 3 Drawing Sheets

ADJUSTABLE FOOT SUPPORT

TECHNICAL FIELD

This invention relates to adjustable foot supports for vehicles and more particularly to an adjustable foot support having one or more foot rest surfaces that are longitudinally adjustable for positioning to accommodate the varying leg lengths of various vehicle operators.

BACKGROUND OF THE INVENTION

Current automotive vehicles are generally provided with accelerator and brake pedals located in relatively fixed positions with a fixed extent of operating motion. They cannot be adjusted closer to or farther away from the driver. Instead it is conventional to provide an adjustable seat so that the driver can be moved relative to the pedals to accommodate the varying lengths of legs of various vehicle operators. A small percentage of vehicles have been offered with adjustable pedals which may reduce the amount of seat adjustment needed to accommodate various operators.

In some vehicles, portions of the vehicle floor or toe panel may include a stationary foot rest against which the foot of a vehicle operator may be positioned while it is otherwise inactive.

SUMMARY OF THE INVENTION

The present invention provides an adjustable foot support for an automotive vehicle of the type having at least one adjustable actuating foot pedal, such as a brake pedal and/or an accelerator pedal, that is movable between forward and rear pedal adjustment positions to accommodate varying leg lengths of various operators of the vehicle. The foot support includes a normally stationary foot rest against which all or part of the foot of a vehicle operator may be supported, or rested during periods of inactivity of the foot. The foot rest is connected with foot rest adjusting means for selectively adjusting the foot rest between stationary forward and rear foot rest adjustment positions to obtain a comfortable position that accommodates the varying leg lengths of the various operators. Preferably, the foot rest adjusting means are movable in concert with associated pedal adjusting means for simultaneously positioning the actuating foot pedal and the foot rest in their desired positions. In this way the foot rest will always be positioned in a comfortable location relative to the other actuating pedals such as the brake and accelerator pedal.

In preferred embodiments, the foot rest may include either or both of a foot supporting surface for supporting a foot of the operator while the foot is in an inactive state and a heel supporting surface optionally connected with the foot supporting surface and extending laterally below an adjacent actuating foot pedal, such as a brake pedal. The heel supporting surface is positioned below the brake pedal to support the heel of a foot wherein the ball of the foot is operatively engaging the brake pedal, or other actuating foot pedal, while the vehicle is in a slowing or stopping mode. The heel supporting surface prevents the heel of the foot from sliding forward excessively from the position of the brake pedal so that the foot remains in a comfortable position while operating the brake pedal.

In one optional embodiment, the foot support adjusting means may include a parallelogram linkage swingingly supporting the foot rest, and positioning means, such as a powered screw and nut, operative to selectively position the linkage in any of a range of stationary positions between the forward and rear foot rest adjustment positions. The actuating means may be controlled in concert with actuating means for an associated brake pedal, or other pedal, so that the linkages of the pedal and the foot rest move together into related optimal positions as selected by the vehicle operator.

These and other features and advantages of the invention will be more fully understood from the following description of certain specific embodiments of the invention taken together with the accompanying drawings.

DESCRIPTION OF THE PREFERRED EMBODIMENT

Figure 1:
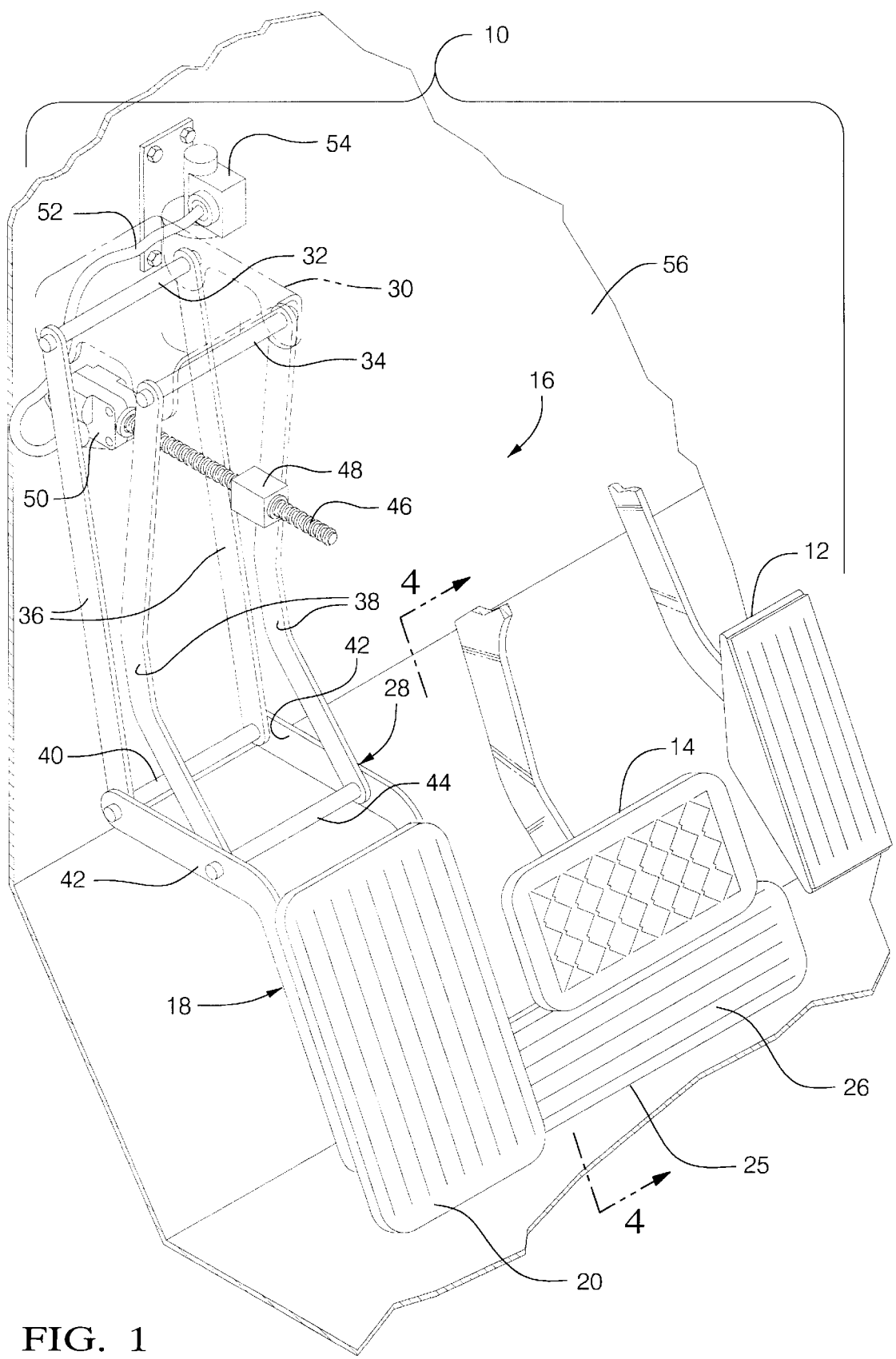
FIG. 1 is a fragmentary perspective view of an adjustable foot support including a foot rest and adjusting means therefor in accordance with the invention.
Figure 2:
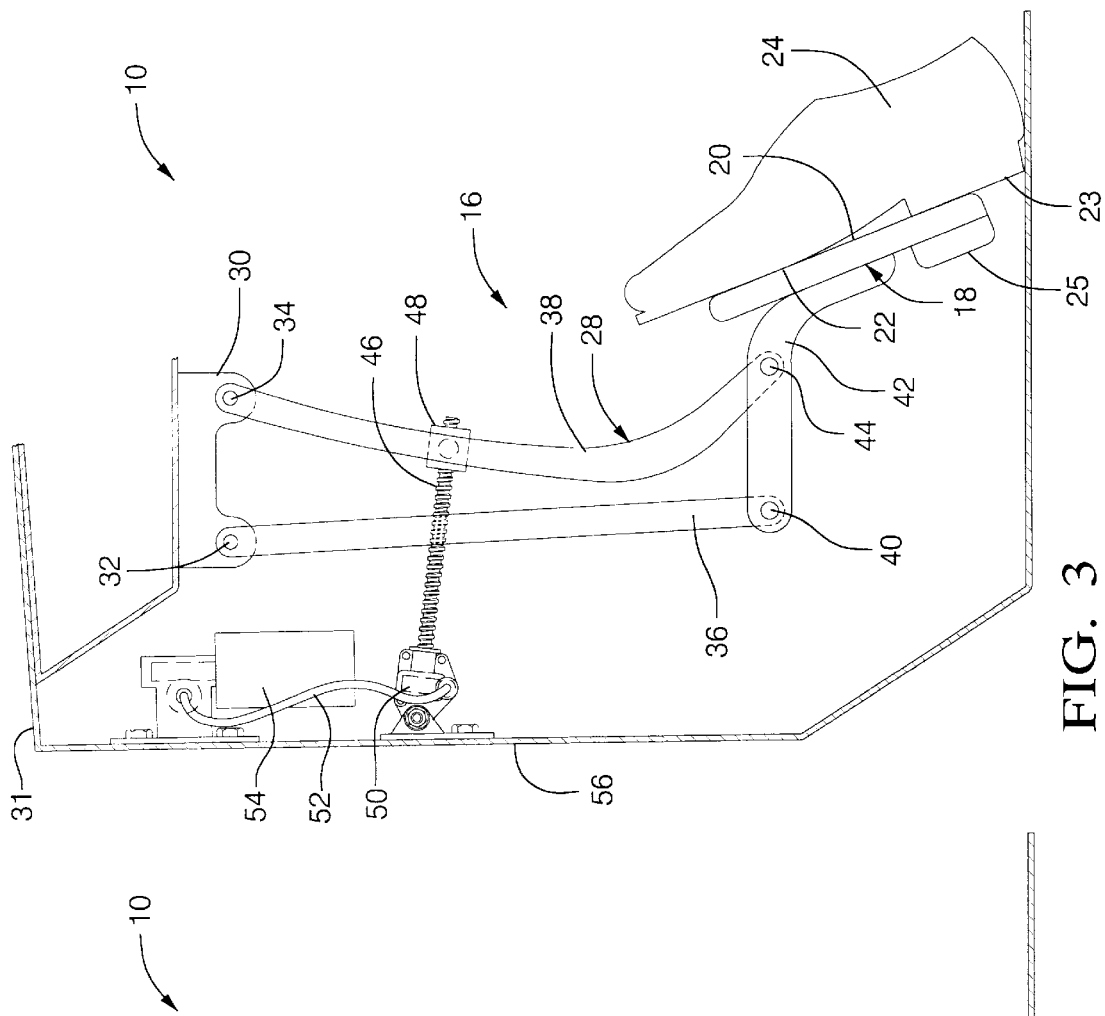
FIG. 2 is a side view of the foot support of FIG. 1 adjusted to a full forward position.
Figure 3:
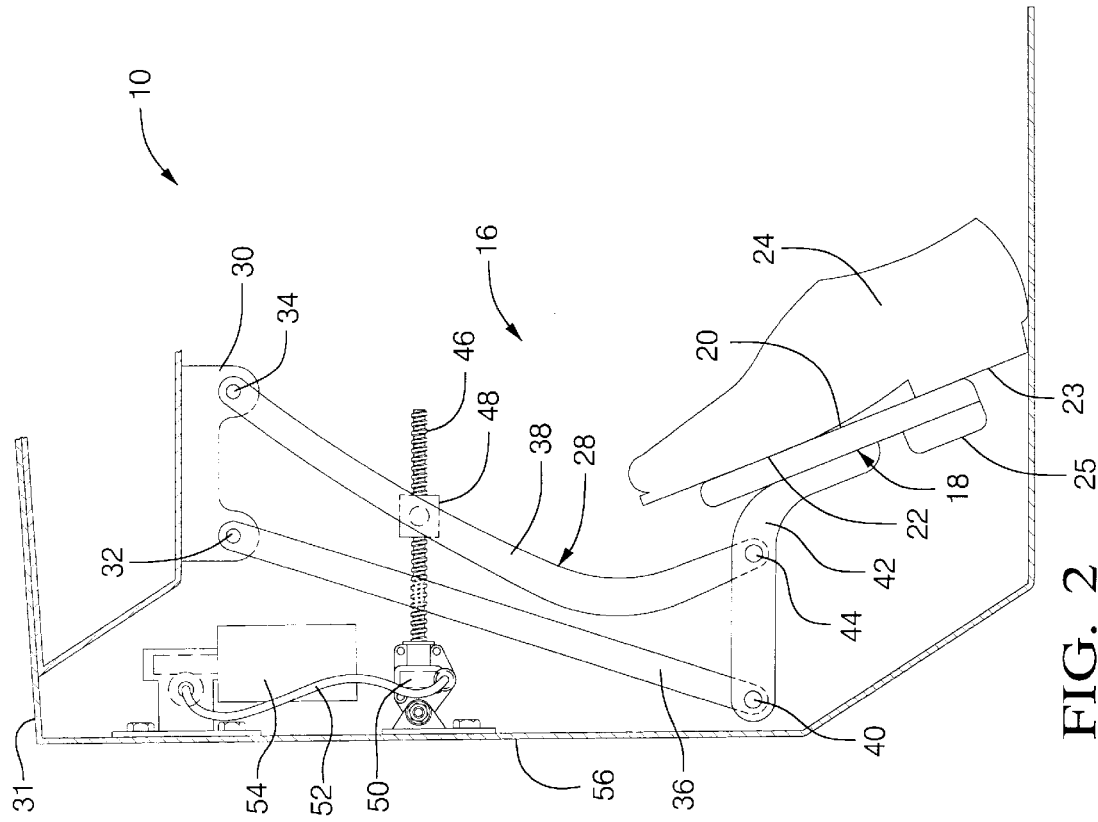
FIG. 3 is a view similar to FIG. 2 with the foot support adjusted to a full rearward position.

Referring now to FIGS. 1–3 of the drawings in detail, numeral 10 generally indicates an automotive vehicle within which are mounted an accelerator pedal 12 and a brake pedal 14. Both pedals have adjusting mechanisms (not shown, but see FIG. 4) for providing forward and rearward adjustment of the positions of these pedals to comfortably accommodate vehicle operators having various leg lengths. Vehicle 10 is also provided with an adjustable foot support according to the invention and generally indicated by numeral 16.

Foot support 16 includes a normally stationary foot rest 18 having two connected portions 20, 25 serving different and separable functions. These include a generally rectangular portion defining a foot supporting surface 20 positioned laterally beside the brake pedal 14 and capable of supporting both the ball 22 and heel 23 portions of a foot 24 of the operator for resting the foot 24 when it is in an inactive condition.

Extending laterally sideways from a lower portion of the foot supporting surface 20 is a heel supporting portion 25 having a heel supporting surface 26 extending laterally to a position below the brake pedal 14. Surface 26 is engagable by the heel portion 23 of the operator's foot 24 when the ball portion 22 of the foot is pressed against the brake pedal 14 for engaging the vehicle brakes. If the force of the operator's foot 24 on the brake pedal 14 is sufficiently high, the heel portion 23 of the foot will engage the heel supporting surface 26, preventing the heel portion 23 from advancing excessively forward relative to the ball portion 22 of the foot engaging the brake pedal 14, thereby maintaining the brake actuating foot 24 of the operator in a comfortable position during vehicle operation. If desired, the heel supporting portion 25 containing surface 26 may be made yieldable upon the application of excessive force. This portion 25 is preferably positioned so that upon yielding it will engage the adjacent vehicle floor and be prevented from moving forward a significant amount from its desired position.

In order to maintain the foot rest 18 in general lateral alignment with the longitudinally adjustable accelerator and brake pedals 12, 14, the adjustable foot support 16 is provided with foot rest adjusting means including a parallelogram linkage generally indicated by numeral 28. Linkage 28 includes a bracket 30 secured to an upper mounting panel 31 of the vehicle 10 and supporting a front pivot pin 32 and a rear pivot pin 34 spaced longitudinally and extending in parallel relationship. The pivot pins 32, 34 support at least one and preferably, as shown, a pair of front swing arms 36 and rear swing arms 38. The front swing arms 36 are pivotably connected such as by a front pin 40 to front pivot points on support arms 42 which engage and support the foot rest 18. The rear swing arms 38 are similarly pivotably connected, such as by a rear pin 44, to longitudinally spaced rear pivot points of the support arms 42.

The bracket 30, swing arms 36, 38 and support arms 42 provide a pair of four bar linkages by which the foot rest 18 may be swingably moved between forward and rear foot rest adjustment positions illustrated in FIGS. 2 and 3 of the drawings. Adjustment of the linkage is generally required only once for each change to a different sized operator of the vehicle so that, after positioning of the foot support 16, its location remains fixed during vehicle operation.

While any suitable means of positioning the linkage 28 may be utilized, the illustrated embodiment includes a power actuator including an actuating screw 46 and a threaded nut 48 driven by the screw and connected with one of the swing arms, such as rear swing arm 38. The actuating screw 46 is rotatable by a gear box 50 driven by a cable 52 powered by an electric motor drive 54 mounted in any suitable position, such as the vehicle bulkhead 56. Similar positioning systems, or any other suitable adjustment devices or mechanisms, may be used in connection with the brake pedal 14 and accelerator pedal 12 to provide for their adjustment between corresponding forward and rear adjustment positions as selected in the design of the vehicle 10.

Preferably, the motor drive 54 actuating the adjusting means for the foot rest 18 is controlled for movement together with the actuating means for an associated brake pedal 14 and/or accelerator pedal 12 so that the forward or rearward adjusting motion of the foot rest 18 takes place together with corresponding motions of the brake pedal 14 and/or accelerator pedal 12 during adjustment by their respective mechanisms. Alternatively, any suitable form of mechanism could be utilized to accomplish the desired purpose of maintaining adjustment positions of the foot rest 18 in correspondence with the adjusted positions of the associated brake pedal 14 and/or accelerator pedal 12.

Desirably, the foot supporting surface 20 of the foot rest 18 is maintained at a longitudinal position generally parallel with that of the accelerator pedal 12. The heel supporting surface 26 of the foot rest 18 is preferably maintained at a position slightly below and forward of the position of the brake pedal 14 prior to actuation of the brakes. Depression of the brake pedal upon brake actuation, as shown in FIG. 4, brings the surface of brake pedal 14 relatively close to alignment with the heel supporting surface 26 of the foot rest 18 so that the ball portion 22 of a foot 24 engaging the brake pedal 14 is comfortably positioned relative to the heel portion 23 engaging the heel supporting surface 26 of the heel supporting portion 25.

Figure 4:
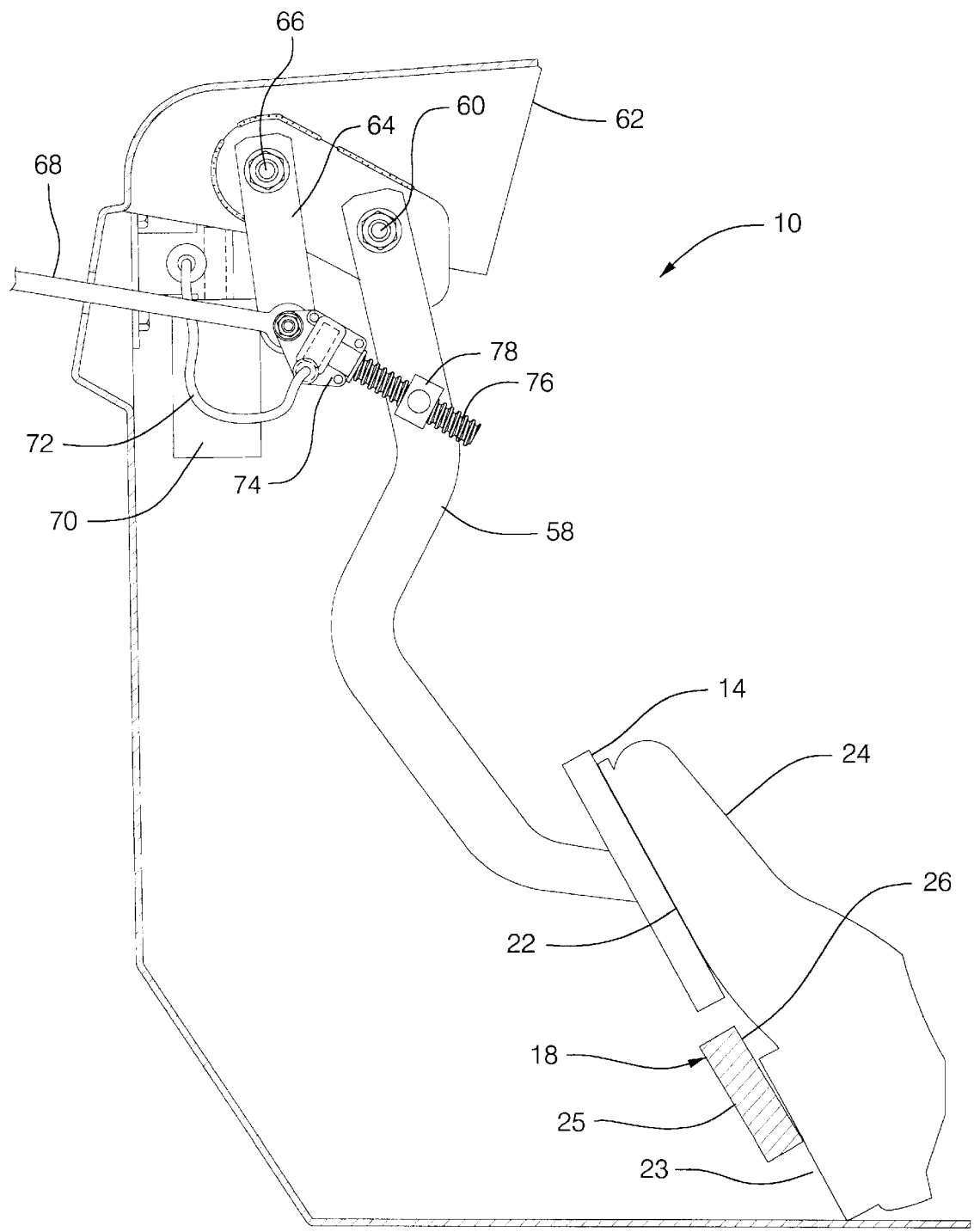
FIG. 4 is a cross-sectional side view illustrating the relative positioning of the heel supporting surface of the foot rest of FIGS. 1–3 relative to an associated brake pedal being actuated by the foot of an operator.

FIG. 4 also illustrates one possible form of adjusting means for the brake pedal 14, including a brake arm 58 pivoted on a rear pivot 60 of a bracket 62. A slave pedal 64 pivoted on a front pivot 66 connects with a push rod 68 for actuating the brake. Positioning means adjustably connect the brake arm 58 with the slave pedal 64 to drive the slave pedal 64 during brake actuation and to provide for adjustment of the brake pedal 14 position as desired. The positioning means include a motor drive 70, flexible cable 72, gear box 74 mounted on the slave pedal 64, adjusting screw 76 driven by the gear box, and a threaded nut 78 connected with screw 76 and with the pedal arm 58. Motor controls, not shown, may be synchronized to operate the brake motor drive 70 in concert with the foot support motor drive 54 to maintain the brake pedal 14 and the heel supporting surface 26 of the foot rest 18 in the proper relationship.

It should be noted that, if desired, a foot rest, such as foot rest 18, may be made with only a foot supporting surface, such as surface 20, or a heel supporting surface, such as surface 26, so that the foot resting function and the heel supporting function of the foot rest may be provided separately from one another or, as in the present instance, by a single foot rest member combining the dual functions discussed.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

What is claimed is:

1. Adjustable foot support in combination with an automotive vehicle including at least one actuating foot pedal having a normally fixed non-actuation position that is adjustable in a range between forward and rear pedal adjustment positions to accommodate varying leg lengths of various operators and a power adjuster operable to selectively vary said normally fixed position of the actuating foot pedal within said range, said foot support comprising:

a normally stationary foot rest for optionally resting a foot of a vehicle operator during periods of inactivity; and foot rest adjusting means including a power adjuster operable to selectively adjust said foot rest between stationary forward and rear foot rest adjustment positions to position the foot rest in a comfortable position that accommodates said varying leg lengths of various operators.

2. A combination as in claim 1 wherein said power adjusters are movable together for simultaneously positioning the normally stationary non-actuation position of said actuating foot pedal and said normally stationary foot rest.

3. A combination as in claim 1 wherein said foot rest includes a foot supporting surface positioned laterally adjacent to said adjustable actuating foot pedal.

4. A combination as in claim 3 wherein said foot rest further comprises a distinct normally stationary heel supporting surface extending below said actuating foot pedal to limit relative travel of a heel and ball of a foot operatively engaging said actuating foot pedal.

5. A combination as in claim 4 wherein said power adjusters are movable together for simultaneously positioning the normally stationary non-actuation position of said actuating foot pedal and said normally stationary foot rest.

6. A combination as in claim 5 wherein said actuation foot pedal is a brake pedal.

7. A combination as in claim 6 wherein said heel supporting surface extends laterally from adjacent said foot supporting surface to a position below the brake pedal.

8. Adjustable foot support in combination with an automotive vehicle including at least one actuating foot pedal having a normally fixed non-actuation position that is adjustable in a range between forward and rear pedal adjustment positions to accommodate varying leg lengths of various operators and a power adjuster operable to selectively vary said normally fixed non-actuation position of the actuating foot pedal within said range, said foot support comprising:

a foot rest including a normally stationary heel supporting surface extending below said actuating foot pedal to limit relative travel of a heel and ball of a foot operatively engaging said actuating foot pedal; and foot rest adjusting means including a power adjuster operable to selectively vary said normally stationary heel supporting surface between stationary forward and rear foot rest adjustment positions to position the heel supporting surface in a comfortable position that accommodates said varying leg lengths of various operators.

9. A combination as in claim 8 wherein said power adjusters are movable together for simultaneously positioning the normally fixed non-actuation position of said actuating foot pedal and said normally stationary foot rest.

10. A combination as in claim 9 wherein said actuating foot pedal is a brake pedal.

11. Adjustable foot support for an automotive vehicle including at least one actuating foot pedal having a normally fixed non-actuation position that is adjustable in a range between forward and rear pedal adjustment positions to accommodate varying leg lengths of various operators, and a power adjuster operable to selectively vary said normally fixed position of the actuating foot pedal within said range, said foot support comprising:

a normally stationary foot rest positioned adjacent said adjustable actuating foot pedal; and foot rest adjusting means for selectively adjusting said foot rest between stationary forward and rear foot rest adjustment positions to position the foot rest in a comfortable position that accommodates said varying leg lengths of various operators, said foot rest adjusting means including a parallelogram linkage swingingly supporting said foot rest for movement between said forward and rear foot rest adjustment positions, and a power adjuster drivingly connected to said linkage and operable to selectively position said linkage in any of a range of stationary positions between said forward and rear foot rest adjustment positions.

12. Adjustable foot support as in claim 11 wherein said actuating foot pedal is a brake pedal and said foot rest includes a foot supporting surface located laterally adjacent the brake pedal.

13. Adjustable foot support as in claim 12 wherein said foot rest further includes a heel supporting surface extending laterally from adjacent said foot supporting surface to a position below the brake pedal.

14. Adjustable foot support as in claim 11 wherein said actuating foot pedal is a brake pedal and said foot rest includes a heel supporting surface positioned below the brake pedal.

* * * * *